United States Patent [19]
Ichinose et al.

[11] Patent Number: 5,926,560
[45] Date of Patent: Jul. 20, 1999

[54] METHOD OF READING COLOR IMAGE, COLOR IMAGE READING APPARATUS AND SYSTEM FOR READING COLOR IMAGE

[75] Inventors: Shuichi Ichinose, Nagano; Toshiki Fujisawa; Kousei Miyauchi, both of Tokyo, all of Japan

[73] Assignees: Seiko Epson Corporation; Konica Corporation, both of Tokyo, Japan

[21] Appl. No.: 08/852,551

[22] Filed: May 7, 1997

Related U.S. Application Data

[30] Foreign Application Priority Data

May 13, 1996 [JP] Japan ................................. 8-117274

[51] Int. Cl.⁶ ........................................................ G06K 9/00
[52] U.S. Cl. ........................... 382/162; 382/319; 358/519; 358/522
[58] Field of Search ..................................... 382/162, 167, 382/172, 168, 274, 318, 319; 358/518, 519, 522, 527, 506

[56] References Cited

U.S. PATENT DOCUMENTS

| 5,210,600 | 5/1993 | Hirata ........................................ 358/474 |
| 5,751,451 | 5/1998 | Ogoshi et al. ........................... 382/167 |

FOREIGN PATENT DOCUMENTS

| 1-288060 | 11/1989 | Japan ................................ H04N 1/04 |
| 7-22311 | 3/1995 | Japan ................................ H04N 1/04 |
| 7-86652 | 9/1995 | Japan ................................ G03B 27/73 |

*Primary Examiner*—Phuoc Tran
*Attorney, Agent, or Firm*—Morgan, Lewis & Bockius LLP

[57] ABSTRACT

In a state where no original document is set, light emitted from a light source 6 is received by a sensor 5, a integrated light quantity reference value with which an output is made to be predetermined value V0 is obtained (P1), a magnification of the quantity of light and a gamma correction table are produced from gamma function data for prescanning (P2-1), a quantity of light for prescanning is obtained in accordance with a light quantity adjustment value obtainable from the magnification of the quantity of light and the integrated light quantity reference value and prescanning of a color negative film is performed (P2-2), and an image signal obtained by prescanning is converted with the gamma correction table so as to output image data (P2-3). A magnification of the quantity of light is determined and the gamma correction table is produced from gamma function data for main scanning produced in accordance with image data obtained in prescanning (P3-1), a quantity of light for main scanning is obtained from the magnification of the quantity of light and the integrated light quantity reference value to perform main scanning (P3-2), and the gradient of an image signal obtained from this is further converted with the gamma correction table so as to output mainly-scanned image data (P3-3).

7 Claims, 7 Drawing Sheets

METHOD OF READING COLOR IMAGE, COLOR IMAGE READING APPARATUS AND SYSTEM FOR READING COLOR IMAGE

BACKGROUND OF THE INVENTION

1. Field of the Invention

The present invention relates to an image reading apparatus, and more particularly to a method of reading color image, color image reading apparatus and system for reading color image for obtaining image data by reading a color film.

2. Description of Related Art

An apparatus has been developed which optically reads a color film by an image sensor composed of a storage-type charge transfer device, such as a CCD, thereof and then separates the color of the image so as to obtain image data.

However, in a case where image data is obtained from a color film, the transmittance of the film varies depending upon the type of the film or exposing conditions employed in the photographing operation. Therefore, there arises a problem in that desirable color signals (three primary colors consisting of red, green and blue) cannot be obtained only by, as it is, A/D-converting an output from the CCD to determine the quantity of transmitted light as has been performed when a monochrome film is read.

As a technique attempted to solve the above-mentioned problem, a method is available which comprises the steps of performing scanning (prescanning) for analyzing exposing conditions employed in the photographing operation before scanning (main scanning) for obtaining image data from the color film is performed; and performing main scanning by using a result of the analysis so as to reproduce the gradation and/or color.

As an example of the above-mentioned method, a technique disclosed in Japanese Patent Publication No. 7-22311 is structured as follows:

(1) Initially, shading data is obtained such that an illuminating means illuminates an original color image document with a first quantity of light, and then a color image signal obtained by color-separating the image by a reading means is stored in a storage means.

(2) Then, exposure conditions and so forth employed in the photographing operation are detected to determine the quantity of light of the lamp by performing prescanning such that the illuminating means illuminates the original color image document with the first quantity of light, and then a color-separated color image signal is obtained by the reading means. Then, sampling of the density of the image of the color original document is performed so that each of R, G and B pixels in the color image signals for each sample line is subjected to a correction calculation for a standardizing process with shading data obtained in step (1). Thus, the white level of the color image signal is identified.

After reading and the correction calculation of all of the sample lines have been completed, the quantity of light (a second quantity of light) for performing main scanning is obtained such that a determining means determines the second quantity of light in accordance with the ratio of a predetermined value corresponding to an output from the reading means with respect to the white image and the above-mentioned white level in such a manner that the white level of the color image signal realized by irradiating and reading (the color image document) with the second quantity of light is made to be the above-mentioned predetermined value. Then, (3) Main scanning is performed.

As another example of the above-mentioned method, a technique has been disclosed in Japanese Patent Publication No. 7-86652 in which data of a light transmittance characteristic for each color with respect to quantities of exposure of various color films previously obtained by measurement is previously stored in a memory means. Then, (1) initially, prescanning is performed, and then the distribution of levels of image signals obtained by prescanning and then data of the above-mentioned light transmittance characteristic are used to determine an exposure range employed in the photographing operation. Then, a result of the determination is made to correspond to the gradient so as to obtain gradient characteristic conversion data for converting the gradient characteristic of each image signal obtained by main scanning.

(2) Then, main scanning is performed, and then the gradient characteristic of an image signal obtained by main scanning is converted in accordance with the foregoing gradient characteristic conversion data.

In a word, in a case where image data is obtained from a color image document, such as a negative film, the conventional technique has been structured such that the color image document is prescanned to obtain exposure conditions and so forth employed in the photographing operation. Then, the exposure conditions and so forth are used to perform main scanning so as to reproduce the gradient and the color. Among the foregoing techniques, the technique disclosed in Japanese Patent Publication No. 7-22311 is structured such that a portion (a base film) of the color image document is read with the first quantity of light before the exposure conditions and so forth employed in the photographing operation are detected so as to obtain shading data. Then, R, G, B for each pixel of the color image signal obtained by prescanning are corrected, and then prescanning is performed with the first quantity of light. The technique disclosed in Japanese Patent Publication No. 7-86652 is structured such that gradient characteristic conversion data for converting the gradient characteristic of each image signal obtainable by main scanning is obtained when prescanning is performed by storing, in the memory means, light transmittance characteristic data for each color with respect to the quantities of exposure of various color films obtained by previous measurement.

As described above, one of important factors to obtain image data from a color image document is to obtain the exposure conditions and so forth employed in the photographing operation. To obtain preferred exposure conditions and so forth, an appropriate quantity of the lamp must be obtained. In this case, influences of individual differences of the components of the scanner, such as the deterioration of the lamp and the difference in the sensitivity among the image sensors, such as the CCD, on the quality of the image cannot be ignored.

For example, the above-mentioned conventional technique has been arranged such that the quantity of light of the lamp preferable for the main scanning operation is obtained by determining the voltage with which the illuminating means (a projecting lamp) is turned on and the diaphragm ratio to perform the shading correction so as to absorb dispersion in the line direction. Thus, dispersion among the films can somewhat be absorbed. However, no contrivance for absorbing dispersion occurring attributable to individual differences of the components of the scanner has been disclosed.

Hitherto, dispersion occurring due to the individual differences have been overcome by providing a safety allowance for an allowable error when the product of the color image reading apparatus is manufactured. That is, in a case where the quantity of light stored in the sensor exceeds a saturation point or has a value near zero, the former case results in that the output from the sensor cannot be identified as an image signal. In the latter case, noise is made to be excessive, causing the quality of the image to deteriorate considerably. To solve the foregoing problems, design of the product has been performed such that the reference value for the stored quantity of light is set to a safety value near the central value to prevent the fact that the quantity of light stored in the sensor does not exceed the saturation point or have a value near zero.

However, it is ideal for realizing a high image quality to make the reference value for the stored quantity of light to approach the saturation point. Since many noises are generated in a direction toward zero, fixation of the reference value for the stored quantity of light to a value near the central value results in many noises being generated as compared with a case where the reference value is made to be a value near the saturation point. Therefore, the quality of the image in the data state has a limitation and thus an image having a high quality cannot easily be obtained.

SUMMARY OF THE INVENTION

An object of the present invention is to provide a color image reading method, a color image reading apparatus and a color image reading system capable of obtaining image data having a quality superior to that obtainable from the conventional technology by absorbing individual differences of components of a scanner in a previous step of the prescanning operation.

Another object of the present invention is to provide a color image reading method, a color image reading apparatus and a color image reading system structured by modifying a method of correcting the gamma characteristic of an output value from a sensor when a color image original document is read and enabling image data having a high quality to be obtained.

In order to achieve the above-mentioned objects, a color image reading method according to the present invention is arranged to absorb individual differences of components of a scanner such that the color original document reading apparatus adjusts the quantity of light at initialization in a state where no original document is set, an adjustment value is made to be an integrated light quantity reference value, a magnification of the quantity of light and a gamma correction table are obtained from a predetermined film gamma function when prescanning is performed in order to improve the method of correcting the gamma characteristic, and then prescanning is performed to set off the individual difference of the components of the scanner and set off the base density. Moreover, a gamma function for main scanning is obtained in accordance with prescanned image data. In accordance with this, a magnification of the quantity of light and the gamma correction table are obtained to perform main scanning so that image data which has reproduced the exposure conditions employed in the photographing operation is obtained.

A color image reading apparatus according to the present invention comprises integrated light quantity reference value determining means for obtaining an integrated light quantity reference value with which an output value for each color obtained by photoelectrically converting illuminating light emitted from the light source by an image sensor in a state where the original document is not set is made to be a predetermined value; prescanning light quantity magnification determining means for determining a magnification of the quantity of light for prescanning on the basis of gamma function data for prescanning corresponding to each color; main scanning light quantity magnification determining means for determining a magnification of the quantity of light for main scanning on the basis of gamma function data obtained from prescanned image data; light quantity determining means for obtaining the quantity of light for main scanning on the basis of the magnification of the quantity of light for main scanning and a light quantity adjustment value obtainable from the integrated light quantity reference value; and gamma correction table producing means for producing a gamma correction table, wherein after the integrated light quantity reference value has been obtained by the integrated light quantity reference value determining means, the quantity of light for prescanning is obtained from predetermined gamma function data, an output signal is converted with gamma correction data obtainable on the basis of predetermined gamma function data to output prescanned image data, the quantity of light for main scanning is obtained from gamma function data produced on the basis of prescanned image data to perform main scanning of the color image original document, and image data obtained by converting an output signal with gamma correction data obtainable on the basis of gamma function data on the basis of prescanned image data is output.

Moreover, a color image reading system according to the present invention comprises the foregoing color image reading apparatus and a main apparatus, such as a personal computer or an image processing apparatus, for connecting the color image reading apparatus, wherein the main apparatus has histogram producing means which receives gamma function data for prescanning produced to correspond to the types of color image original documents and mainly-scanned image data from the color image reading apparatus so as to produce gradient histogram of an image of interest, gamma function producing means which obtains a threshold for a dark portion and a threshold for a bright portion from the histogram so as to obtain a gamma function, gamma function table producing means for obtaining gamma function data from the gamma function, image data receiving means for receiving image data from the color image reading apparatus and gamma function transmitting means for transmitting gamma function data to the color image reading apparatus, and the main apparatus transmits gamma function data for prescanning to the color image reading apparatus, then receives mainly-scanned image data from the color image reading apparatus to obtain gamma function data for main scanning, transmits gamma function data for main scanning to the color image reading apparatus and receives image data after main scanning has been performed.

According to the present invention, the color original document reading apparatus adjusts the quantity of light in a state where an original document is not set to obtain an integrated light quantity reference value. In accordance with a magnification of the quantity of light obtained from gamma function data when prescanning is performed and the integrated light quantity reference value, an integrated light quantity adjustment value is obtained so that the light quantity for prescanning is obtained. By performing scanning with the above-mentioned quantity of light, the individual differences of components of the scanner can be set off. Therefore, the performance of the image sensor can be used maximally for an information range required for a user. Thus, image data having quality superior to that obtainable from the conventional apparatus can be obtained.

The gamma function for main scanning is obtained from image data obtained by prescanning, the gamma correction table is produced and the output correction portion corrects the output from the sensor. Therefore, quantization error occurring due to the gamma characteristic in an output value from the sensor can be prevented. Thus, image data having a further improved quality can be obtained.

The image reading system according to the present invention has the structure such that the main apparatus performs a complicated processes requiring a large-capacity memory, such as a process for producing the histogram and processes for producing the gamma function and the gamma function table. The color image reading apparatus performs simple processes, such as processes for determining a magnification of the quantity of light, calculating the adjustment value of the quantity of light and producing the gamma correction table. Thus, the individual difference of the components of the scanner, setting off of the base density and determining of correcting parameters for image data can automatically be performed. Therefore, even if the type of the color image original document is changed, the necessity of changing processes in the color image reading apparatus can be eliminated.

DESCRIPTION OF THE PREFERRED EMBODIMENTS

Figure 1:
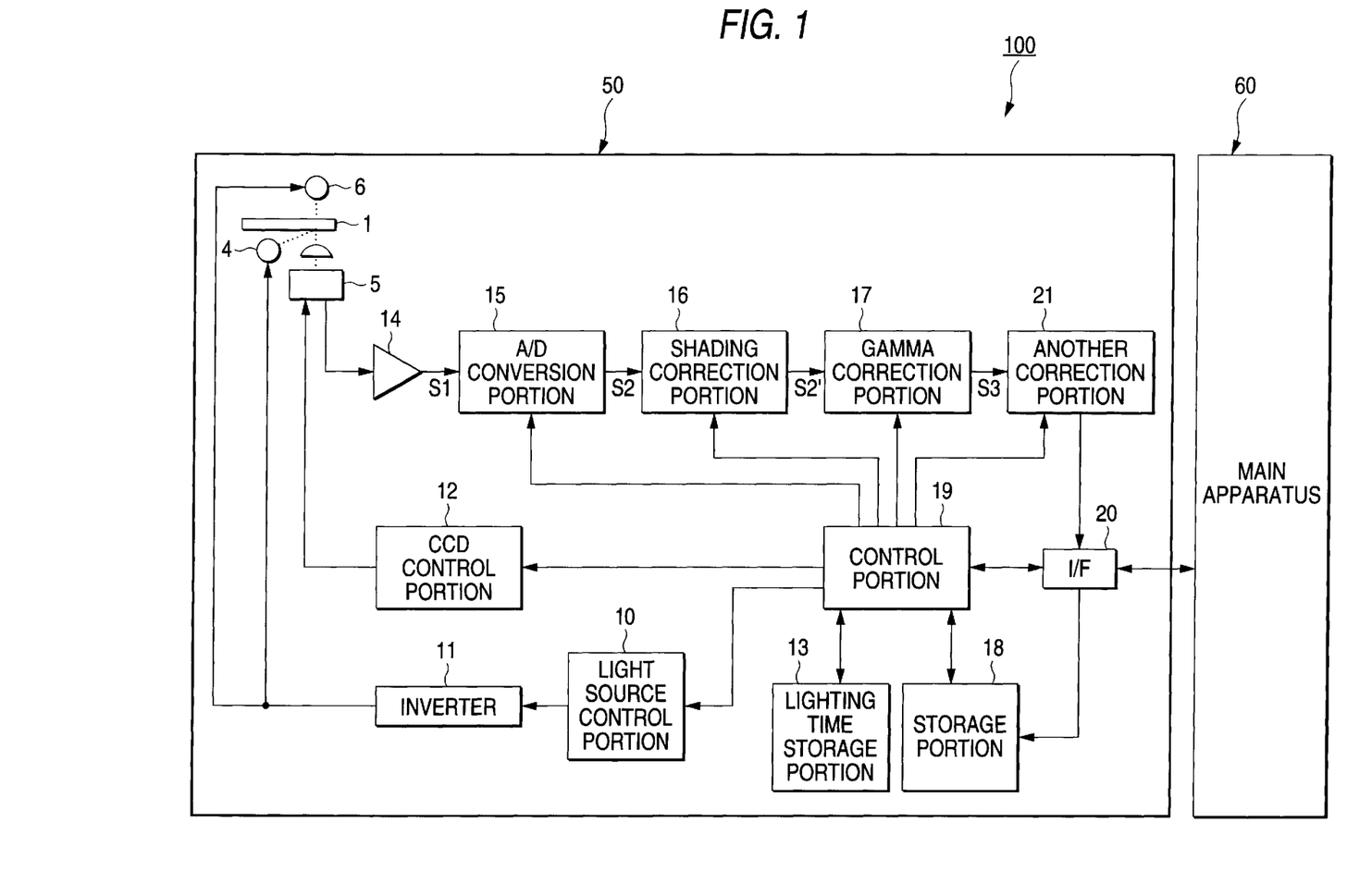
FIG. 1 is a block diagram showing the structure of an essential portion of a preferred embodiment of a color image reading system to which a color image reading method according to the present invention is applied.

Embodiments of the present invention will now be described. FIG. 1 is a block diagram showing the structure of an essential portion of the embodiment of a color image reading system to which a color image reading method according to the present invention is applied.

Referring to FIG. 1, a color image reading system 100 is composed of a color image reading apparatus (hereinafter simply called as a "reading apparatus") 50 and a main apparatus (hereinafter called as a "host) 60 such as a personal computer or image processing apparatus. The reading apparatus 50 receives data and signals supplied from the host 60 and transmits, to the host 60, image data, an initial setting completion signal, a scanning completion signal and the like.

The host 60 is provided with at least a CPU, a storage units, such as a ROM, a memory, a magnetic disk, a floppy disk or the like, a display unit and an interface for transmitting/receiving data and arranged to transmit, to the reading apparatus 50, gamma function data, a scanning instruction signal and the like, to be described later, and to receive data and signals supplied from the reading apparatus 50. The ROM or the storage unit stores means for executing the operation of the host 60 to be described later.

In the reading apparatus 50, an original-document retaining frame 1 is made of a transparent plate made of glass or the like. A transmissive original document (a color original document), such as a color negative film, is placed on the original-document retaining frame 1. A line sensor 5 is composed of a charge storage type optical sensor, such as a CCD. When the color original document is irradiated with light emitted from a light source 6, light which has penetrated the color obtained is, for each pixel for one line, color-separated by the line sensor 5. Thus, light is converted into a charge for each color component (three colors consisting of R, G and B) so as to be output as an electric signal.

Although the example shown in FIG. 1 has the structure such that the line sensor 5 receives light which has penetrated the color obtained and the original-document retaining frame 1, an original-document holder 9 to be described with reference to FIG. 5 may be used to directly receive light which has penetrated the color original document (as for the specific structure of the original document reading portion, refer to FIGS. 4 and 5).

A light-source control portion 10 is controlled by a control portion 19 to control the quantity of light which is emitted from the light source 6 in accordance with an integrated light quantity adjustment value. The control of the quantity of light emitted from the light source 6 can be realized by controlling any one of time for which a light source lamp is turned on, storage time for the sensor and the intensity of light emitted from the light source lamp in such a manner that the output from the line sensor 5 is made to be V0 as described later. FIG. 1 shows the structure which is employed in a case where the quantity of light is controlled by controlling the time for which the light source lamp is turned on.

Specifically, the light-source control portion 10 is controlled by the control portion 19 to transmit, to an inverter 11, a control signal for controlling time for which the light source 6 is turned on in accordance with lighting time data read from a lighting-time storage portion 13. In accordance with the control signal supplied from the light-source control portion 10, the inverter 11 turns on the light source 6 at predetermined time intervals.

The lighting-time storage portion 13 stores lighting time (integrated light quantity adjustment value) for each of the three colors (R, G and B) set by the control portion 19 in accordance with an integrated light quantity reference value (time) in such a manner that the level of the output from the line sensor 5 is made to be V0 (a predetermined value).

Figure 4:
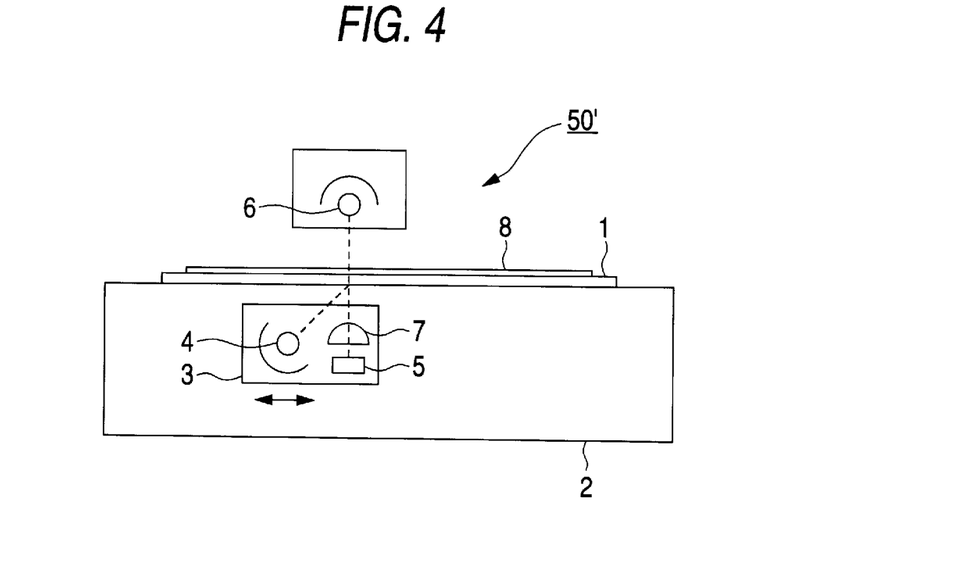
FIG. 4 is a diagram showing the schematic structure of an embodiment of a reading portion of the color image reading apparatus.

The CCD control portion 12 generates shift pulses to correspond to the timing at which the light source 6 is turned on so that the speed at which the line sensor 5 performs reading is controlled to be adaptable to the scanning speed of a carriage 3 (see FIG. 4).

An A/D conversion portion 15 converts light quantity signal S1 amplified by an amplifier 14 and supplied from the line sensor 5 to transmit the same to a shading correction portion 16. The shading correction portion 16 corrects dispersion of the sensitivities and the like for each photoelectric device included in an optical signal supplied from the line sensor 5.

A gamma correction portion 17 uses values in a gamma correction table (to be described later) stored in a storage portion 18 to further convert the gradient of light quantity is S2' corrected by the shading correction portion 16 so as to transmit image signal S3.

The storage portion 18 stores integrated light quantity reference values (Lr, Lg and Lb), light quantity magnifications (Cr, Cg and Cb) for prescanning, the gamma correction table for prescanning and required parameters to be described later and temporarily stores gamma function data for prescanning, gamma function data for main scanning, light quantity magnifications (CR0, CG0 and CB0) for main scanning and a gamma correction table for main scanning each of which is received from the host 60.

The control portion 19 is composed of a microcomputer consisting of a CPU, a RAM, a ROM and so forth and arranged to receive a command signal and data (for example, gamma function data) from the host 60 through the interface 20 so as to control execution of programs and the like (execution means for determining the magnification of the quantity of light, producing the gamma correction table, determining integrated light quantity reference value and the like) stored in the ROM, and transmit, to the host 60, status signals, such as an initial setting completion signal and a scanning completion signal, prescanning image data and main scanning image data through the interface 20.

Another correction portion 21 is a correction portion for performing corrections including color correction, edge highlighting, region enlargement/contraction and the like.

In a case where the quantity of light of the light source 6 is controlled by the method of adjusting the storage time for the sensor, the structure may be formed such that a storage time storing portion is substituted for the lighting-time storage portion 13, the storage time storing portion stores the time intervals of shift pulses set by the control portion 19 in accordance with the integrated light quantity reference value (time) in such a manner that the level of the output from the line sensor 5 is made to be V0 (a predetermined value) and the CCD control portion 12 generates shift pulses to correspond to the intervals of the pulses communicated from the storage time storing portion so as to control the reading speed for the line sensor 5 to be adaptable to the scanning speed for the carriage 3 or 3'. In this case, the light-source control portion 10 controls the inverter 11 to cause the light source to be turned on for a predetermined (a constant) time or continuously.

In a case where the quantity of light of the light source 6 is controlled by the method of adjusting the intensity of light to be emitted from the light source 6, the structure may be formed such that a light intensity storage portion is substituted for the lighting-time storage portion 13, the light intensity storage portion stores the intensity of light of the light source set by the control portion 19 in accordance with the integrated light quantity reference value (the light intensity) in such a manner that the level of the output from the line sensor 5 is made to be V0 (a predetermined value) and the light-source control portion 10 transmits, to the inverter 11, a control signal for controlling the intensity of light of the light source 6 in accordance with light intensity data read from the light intensity storage portion under control of the control portion 19.

Figure 2:
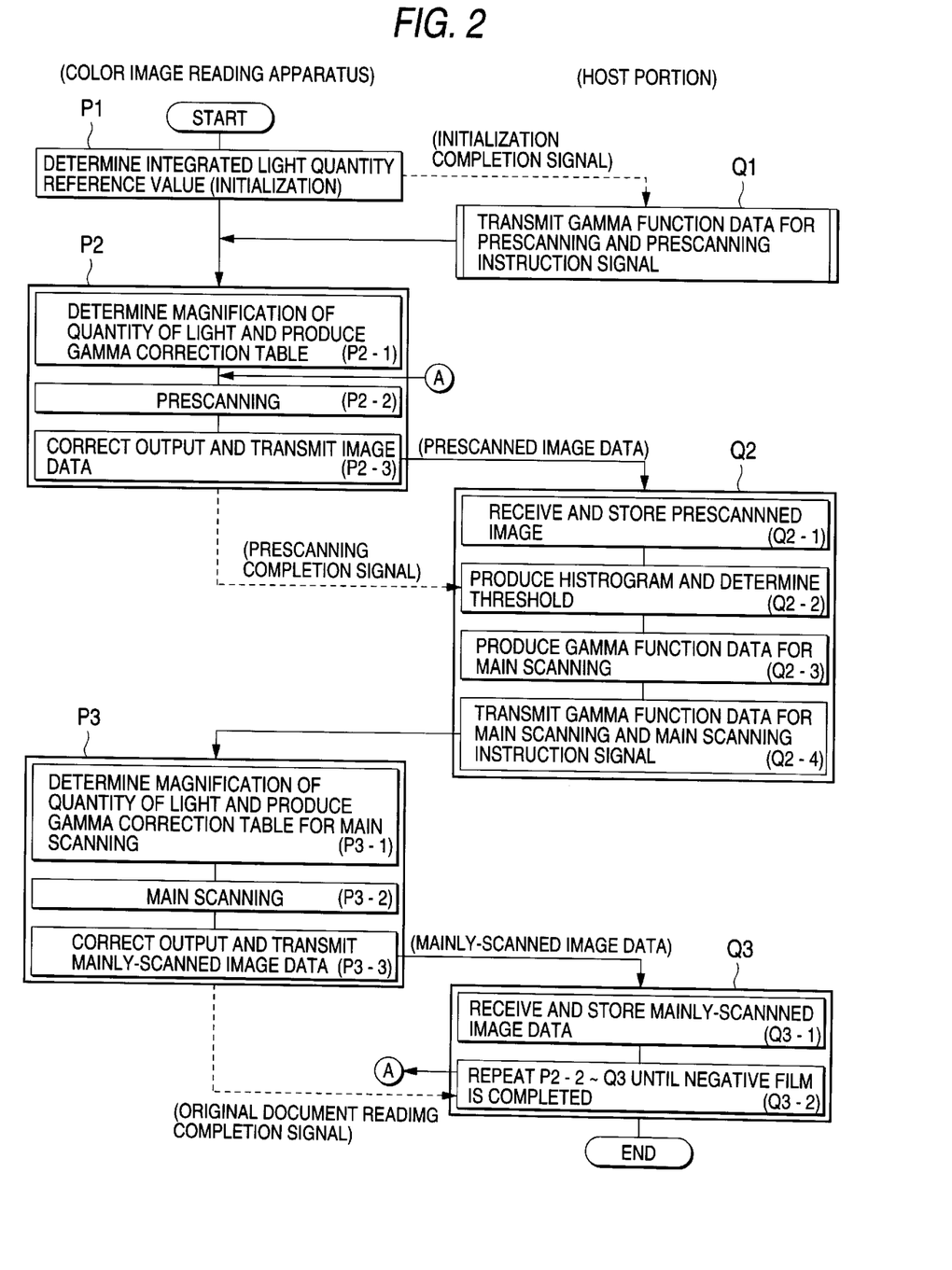
FIG. 2 is a process chart showing an embodiment of the color image reading method according to the present invention.

FIG. 2 is a process chart showing an embodiment of the color image reading method according to the present invention. In this embodiment, the process is mainly sectioned into an operation (P1 to P3) which is performed by the reading apparatus 50 shown in the left-hand portion of FIG. 2 and an operation (Q1 to Q3) which is performed by the host 60 connected to the reading apparatus shown in the right-hand portion of FIG. 2. Although the following description will be made about a case where a negative film is used as the color image document, a similar process may be applied if the employed original document is a light transmissive image document.

A. Contents of Operation of Reading Apparatus

As a first process, light emitted by the light source 6 is received by the line sensor 5 in a state where no color negative film is set, and then the integrated light quantity reference value is determined in such a manner that the output for each color (R, G and B) is made to be predetermined value V0. Then, the initial setting completion signal is supplied to the host 60 (P1).

In this example, light which has penetrated the original-document retaining frame 1 is received by the line sensor 5, and then separated into three colors consisting of R, G and B so that the quantities of light (the charges) are stored. When the stored light quantities L (hereinafter called "integrated light quantities") has been made to be predetermined value L0 as shown in FIG. 3, electric signals each having the level V0 are transmitted (that is, if the output level is set to be V0 (a predetermined value), then the integrated light quantity L0 with which the output level is made to be V0 is determined).

Figure 3:
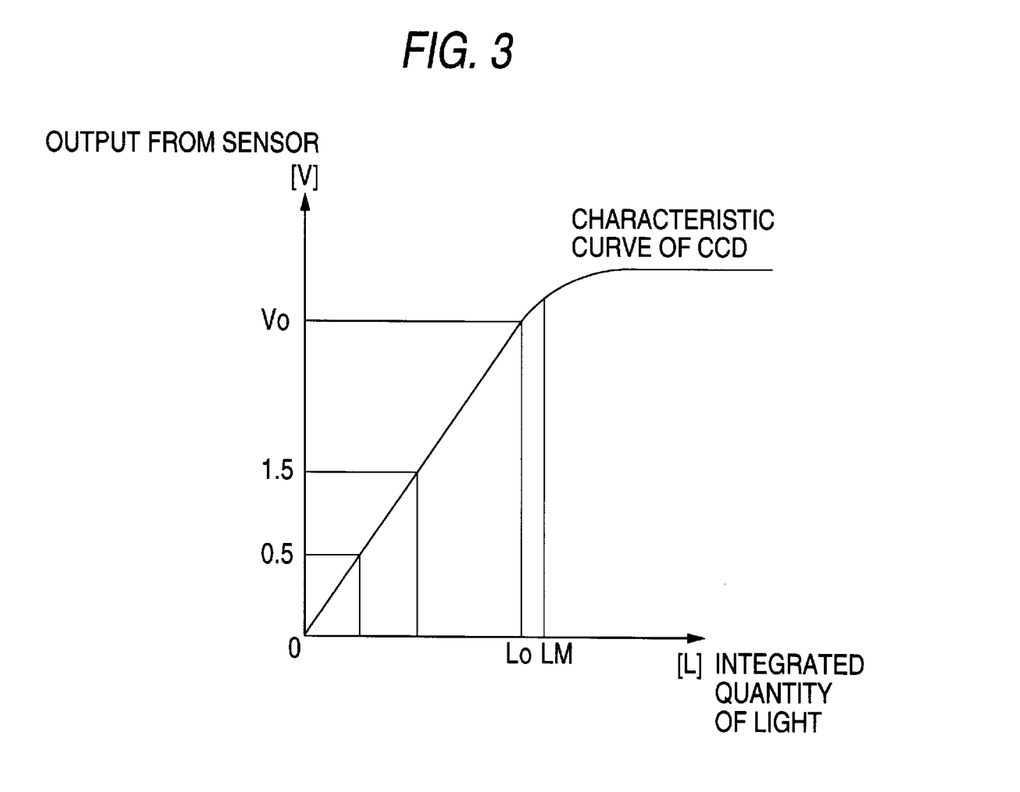
FIG. 3 is a view of explanatory showing the relationship between integrated light quantities and the output levels of an image sensor.

Since the charge storage type photosensor, such as a CCD, is saturated when the integrated light quantity L has exceeded a predetermined light quantity LM as shown in FIG. 3, an integrated region lower than the saturation point LM must be used.

If the integrated light quantity L0 employed as the reference exceeds the saturation point LM, the output from the line sensor 5 is not in proportion to the integrated light quantity L. Since many noises are generated when L0 approaches 0, it is preferable that L0 be set to a value as much as near LM in a range in which L0 does not exceed saturation point LM in order to obtain high image quality.

The adjustment of the integrated light quantity can be realized by a technology disclosed by the applicant in Japanese Patent Laid-Open No. 1-288060 in which the quantity of illuminating light or the light quantity storage time of the sensor is adjusted. The control of the illuminating light quantity can be realized by adjusting the lighting time or the intensity of emitted light. The adjustment of the light quantity storage time for the sensor can be realized by adjusting the period of shift pulses of the line sensor 5. Therefore, when initial setting is performed after the electric power has been supplied, the lighting time for the light source lamp or the light quantity storage time for the sensor or the intensity of the light emitted from the light source lamp with which the output level from the line sensor 5 is made to be V0 may be measured to make the measured value as the integrated light quantity reference value (Lr, Lg and Lb).

In this embodiment, the integrated light quantity reference value determining means causes the control portion 19 to control the light-source control portion 10 until the output level from the line sensor 5 is made to be V0 to turn on the light source 6 so as to measure time (time for which the lamp is turned on) required for the output from the line sensor 5 to be made to be V0. The measured value is stored in the storage portion 18 as the integrated light quantity reference value.

In a case where the control of the integrated light quantity is performed by a method of adjusting the storage time for the sensor, the structure may be formed such that the integrated light quantity reference value determining means causes the control portion 19 to control the CCD control portion 12 in such a manner that the generation of shift pulses is delayed to prevent generation of a next shift pulse until the output level from the line sensor 5 becomes V0, and the time (the storage time for the sensor) for the output level from the line sensor 5 to be made to be V0 is measured. Moreover, the obtained value is stored in the storage portion 18 as the integrated light quantity reference value. In a case where the control of the integrated light quantity is performed by the method of adjusting the intensity of light which is emitted from the light source 6, the integrated light quantity reference value determining means causes the control portion 19 to control the light-source control portion 10 in such a manner that the output from the line sensor 5 is made to be V0 to change the intensity of light which is emitted. Then, the intensity (the intensity of light which is emitted) with which the output level from the line sensor 5 is made to be V0 is determined, and the determined value is stored in the storage portion 18 as the integrated light quantity reference value.

Figure 6:
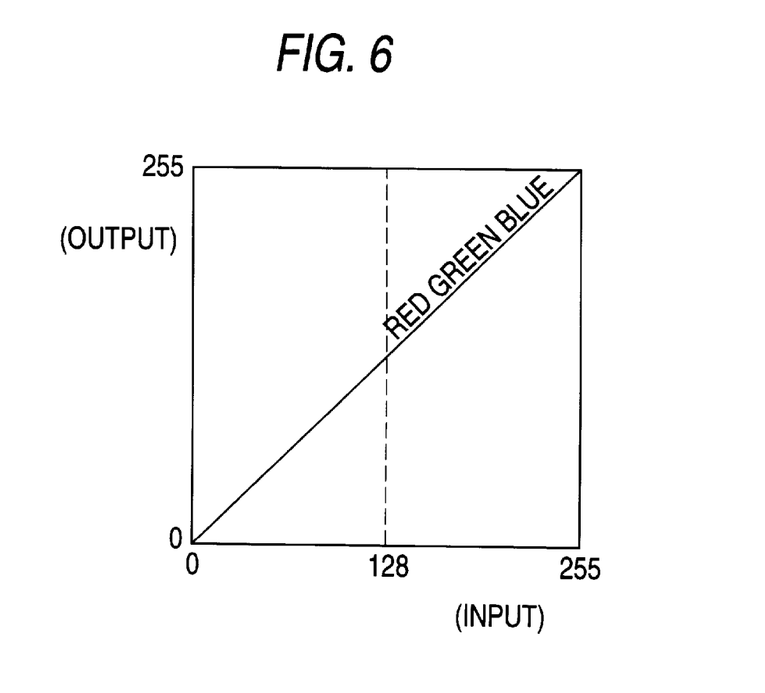
FIG. 6 is a graph showing an example of a curve of gamma function data for use in prescanning.
Figure 7:
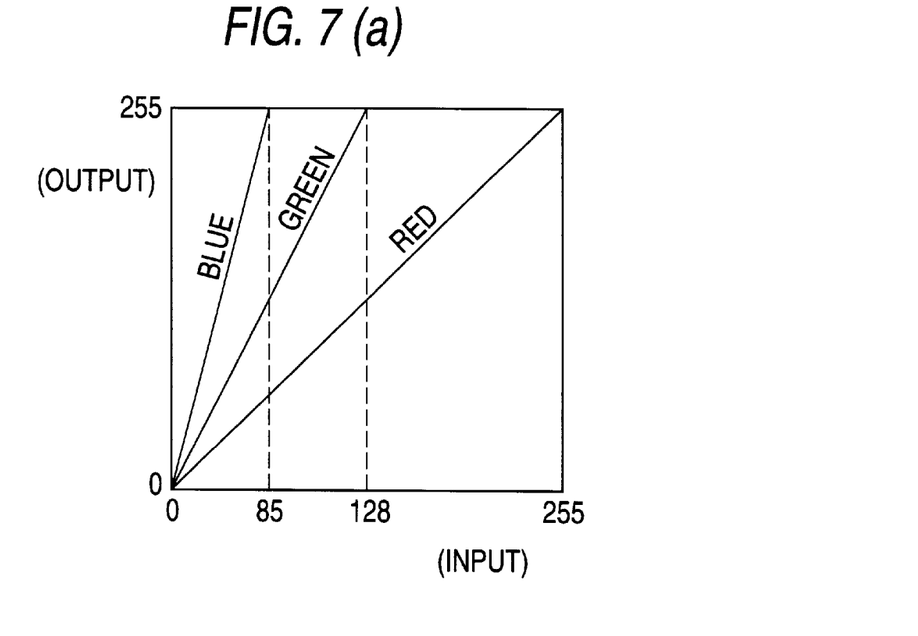
FIG. 7 is a graph showing another embodiment of gamma function data for use in prescanning.

As a second process, the reading apparatus 50 receives, from the host 60, a prescanning instruction signal and gamma function data for prescanning curves as shown in FIGS. 6 and 7 through the interface 20 so as to temporarily store the same in the storage portion 18. Then, the magnifications (Cr, Cg and Cb) of the light quantities for the respective colors are determined, and the gamma correction table for prescanning is made (P2-1).

In accordance with the light quantity adjustment value for prescanning obtained from the magnification of the light quantity and the foregoing integrated light quantity reference value, a quantity of light for prescanning is obtained and prescanning of the color negative film is performed (P2-2).

An image signal obtained by prescanning is converted by the foregoing gamma correction table for prescanning so as to transmit image data for prescanning having an offset base density (P2-3).

Prescanning is an operation for reading an image document which is performed prior to performing an operation (hereinafter called "main scanning") for reading an original document required by a user and in which the base density of a transmitted original document (which is a negative film in this embodiment) attempted to be read is set off in order to mainly obtain data for reproducing exposure;conditions and so forth when the original document has been photographed.

The magnifications (Cr, Cg and Cb) of the quantity of light for prescanning can be obtained by a prescanning light quantity magnification determining means which causes the control portion 19 to obtain input values (R255, G255 and B255) at a point at which the output is made to be a maximum (255) from gamma function data (see FIG. 6) for prescanning stored in the storage portion 18 so that the magnifications are obtained as follows:

Cr=255/R255, Cg=255/G255 and Cb=255/B255

In an example case shown in FIG. 6, Cr=Cg=Cb=255/255=1. In an example case shown in FIGS. 7 (*a*) and 7 (*b*), Cr=255/255=1, Cg=255/128=2 and Cb=255/85=3.

The prescanning light quantity is determined such that the prescanning light quantity determining means causes the control portion 19 to obtain the same from the prescanning light quantity magnifications (Cr, Cg, Cb) and the integrated light quantity reference values (Lr, Lg and Lb) obtained in process P1. Specifically, the light quantity adjustment values (LR1, LG1 and LB1) for prescanning are determined in accordance with the following equations:

*LR1=Lr×Cr, LG1=Lg×Cg, LB1=Lb×Cb*

The light quantity adjustment values (which are light turning on time periods in this embodiment) are supplied to the lighting-time storage portion 13.

The gradient correction table for prescanning is a gradient conversion table for use when the gamma correction portion 17 corrects signal S2' supplied from the shading correction portion. A gamma correction table producing means causes the control portion 19 to multiply the input value of gamma function data for prescanning for a color negative film which is a subject to be prescanned by a prescanning light quantity magnification. An obtained value is stored in the storage portion 18 as a look up table (Look Up Table).

When the light-source control portion 10 receives a control signal for scanning from the control portion 19, the light-source control portion 10 transmits, to the inverter 11, a control signal for controlling the lighting time for the light source 6 in accordance with data of the lighting time read from the lighting-time storage portion 13. The inverter 11 turns on the light source 6 for the above-mentioned lighting time in response to the control signal supplied from the light-source control portion 10.

Light, which has emitted from the light source 6 and which has penetrated the color negative film and the original-document retaining frame 1, is received by the line sensor 5 so that light is color-separated into three colors consisting of R, G and B and thus a light quantity signal is transmitted. In this case, the CCD control portion 12 generates shift pulses to correspond to the lighting timing of the light source 6 so as to control the reading speed of the line sensor 5 to be adaptable to the scanning speed of the carriage 3.

Since the input quantity of light has been adjusted to make the output value to be the predetermined value V0 in a case where a color negative film does not exist, the light quantity signal, which is output from the line sensor 5, has offset individual differences of the light source lamp and the line sensor 5.

An output signal from the line sensor 5 is amplified by the amplifier 14. Amplified signal S1 is, by the A/D conversion portion 15, converted into digital signal S2 which is supplied to the shading correction portion 16. The shading correction portion 16 uses a known method to correct dispersion of the sensitivities and the like for each photoelectric device included in the signal S2 and supplies output signal S' to the gamma correction portion 17.

The gamma correction portion 17 uses the value of a conversion output table for prescanning stored in the storage portion 18. If the signal S2' supplied from the shading correction portion 16 is an input value in the gamma correction table, a corresponding output value (a value in the table) is converted into output signal S3 so as to obtain an image signal S3 from the light quantity signal S2' corrected by the shading correction portion 16 such that the base density of the color negative film is set off. The image signal S3 is subjected to corrections, such as color correction, in the correction portion 21 so as to be transmitted to the host 60 through the interface 20 as image data.

Although prescanned image data is, for each line, supplied to the host 60, prescanning of a negative film is not limited to a quantity for one image and a plurality of images are sometimes included in one film (when a photographed film is ordered a photo processing shop to be developed, one negative film usually includes six frames (six images). Therefore, when prescanning of one negative film has been completed, the control portion 19 transmits a prescanning completion signal to the host 60 through the interface 20.

As a third process, the reading apparatus 50 receives gamma function data for main scanning (refer to a curve shown in FIG. 9) and a main scanning instruction signal from the host 60 through the interface 20 so as to temporarily store gamma function data for main scanning in the storage portion 18, determines the light quantity magnifications (CR, CG and CB) for each color, produces a gamma correction table for main scanning and stores the same in the storage portion 18 (P3-1).

The light quantity for main scanning is obtained from the magnification of the quantity of light and the integrated light quantity reference value. Then, the prescanned color negative film is main-scanned (P3-2).

The gradient of an image signal obtained by the main scanning operation is converted by using the gamma correction table for main scanning so that image data for main scanning is transmitted (P3-3).

Figure 9:
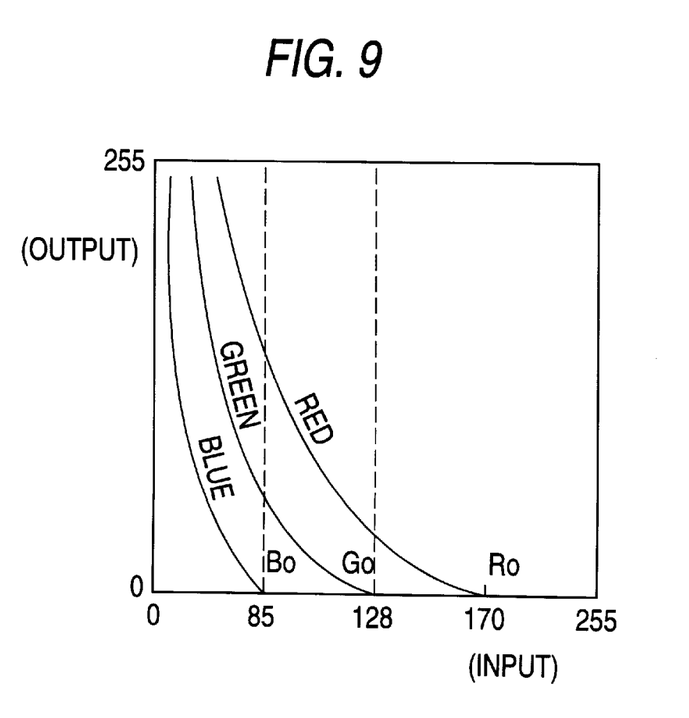
FIG. 9 is a graph showing an example of a curve of gamma function data for use in main scanning.

The light quantity magnifications (CR, CG and CB) for main scanning can be obtained by a main scanning light quantity magnification determining means such that the control portion 19 obtains input values (R0, G0 AND B0) at a point at which the output is made to be minimum (0) from gamma function data for main scanning stored in the storage portion 18 so that the magnifications are obtained as follows:

Cr=255/R0, Cg=255/G0 and Cb=255/B0 (see FIG. 9)

Since R0=170, G0=128 and B0=85 in an example case of the gamma function for main scanning shown in FIG. 9, magnifications are made to be as follows: CR=255/170=1.5, CG=255/128=2 and CB=255/85=3.

The quantity of light for main scanning is determined by a main scanning light quantity determining means such that the control portion 19 determines the same from the magnification of the light quantity for main scanning and the integrated light quantity reference value obtained in process P1. Specifically, the light quantity adjustment values (LR2, LG2 and LB2) for main scanning are determined by the following equations:

$$LR2=Lr \times CR,\ LG2=Lg \times CG,\ LB2=Lb \times CB$$

The determined light quantity adjustment values (which is lighting time in this embodiment) are supplied to the lighting-time storage portion 13.

The gamma correction table for main scanning is made from gamma function data for main scanning supplied from the host 60 which has received the same and is, similarly to the gamma correction table for prescanning, a gradient conversion table for use when the signal S2' supplied from the shading correction portion is corrected by the gamma correction portion 17. The gamma correction table producing means causes the control portion 19 to multiply the input value of input/output data for main scanning by the light quantity magnification for main scanning so as to store the same in the storage portion 18 as a lookup table.

When the control portion 19 has obtained the light quantity adjustment value, the control portion 19 transmits a scan start signal to a drive portion (not shown) for the carriage 3, the light-source control portion 10 and the CCD control portion 12. Then, main scanning is performed. Since the operations which are performed by the light-source control portion 10 to the shading correction portion 16 are, in the main scanning operation, similar to those which are performed when prescanning is performed, the operations are omitted from description.

Figure 10:
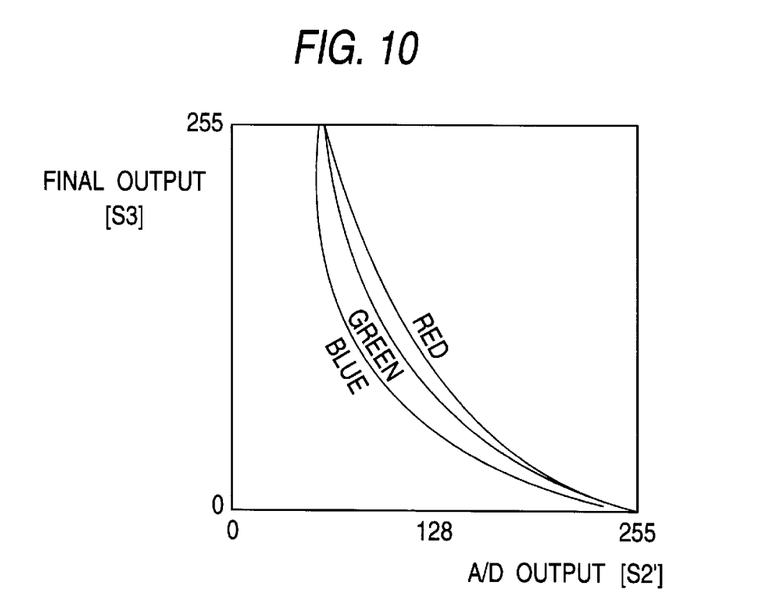
FIG. 10 is a graph showing the relationship between signals (inputs) after shading correction has been performed and output signals after gamma correction has been performed.
Figure 11:
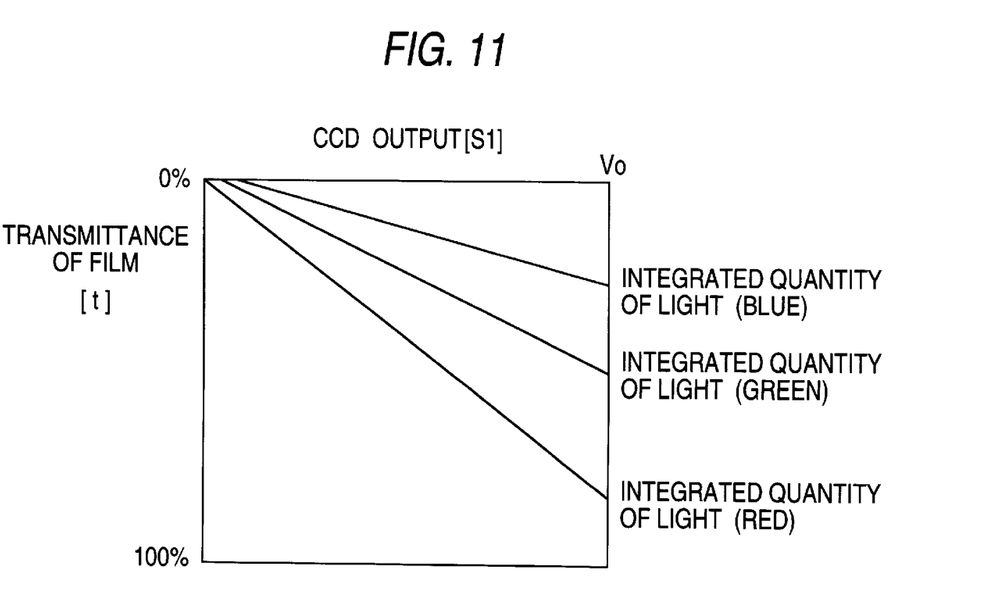
FIG. 11 is a graph showing the relationship between transmittance of a film with the quantity of light for main scanning obtained by the present invention and outputs from the sensor.

The gamma correction portion 17, which has received the output signal S2' from the shading correction portion 16, uses the values in the gamma correction table for main scanning stored in the storage portion 18 to convert the gradient of the light quantity signal S2' corrected by the shading correction portion 16 so as to output the image signal S3 (see FIG. 10). The curve of the image signal S3 is a curve formed by enlarging the curve shown in FIG. 9 in a direction of the X-axis by a degree corresponding to the magnification of the quantity of light. By enlarging, in the direction of the X-axis, the gamma curve bent sharply near level 0, quantization error can be reduced.

The image signal S3 is, then, subjected to corrections including color correction in the correction portion 21, and then transmitted to the host 60 through the interface 20 as image data for main scanning. In a case where prescanning of one negative film has been completed, the control portion 19 transmits a main scanning completion signal to the host 60 through the interface 20.

B. Contents of Operation of Host

When the host 60 receives the initial setting completion signal from the reading apparatus 50 through the interface, the host 60 transmits gamma function data for prescanning to the reading apparatus 50 together with the prescanning instruction signal, as a first step (Q1).

As gamma function data for prescanning (see FIG. 7), data for setting off the base density when the reading apparatus 50 performs prescanning is supplied.

The signal S2' initialized in the foregoing step (P1) and corrected by the shading correction portion 16 has been normalized such that a state in which no original document is placed on the glass frame 1 is made to be the maximum output value (which is 255 in this case). That is, the input value (axis of abscissa) of gamma function data for prescanning (see FIGS. 6 and 7) corresponds to the value of the transmittance of the film.

Therefore, if the value of the transmittance of the film is previously detected, gamma function data for prescanning (see FIGS. 6 and 7) can be set regardless of the individual difference of the components of the scanner.

Specifically, gamma function data for prescanning for each type of color films can previously be produced because films have various color tones depending upon the types so as to store the gamma function data for prescanning in a storage unit (not shown) of the host 60. A structure may be employed in which gamma function data for prescanning corresponding to a negative film to be read is transmitted from the host 60 to the reading apparatus 50 when the initial setting completion signal has been supplied from the reading apparatus 50 in a case where the type of the film has been instructed by using the operation panel of the host 60 (or the reading apparatus 50).

As a second step, gamma function data for main scanning for obtaining the exposure conditions and the gradient employed in the photographing operation is obtained and transmitted to the reading apparatus 50. Gamma function data for main scanning is produced by analyzing prescanned image data received from the reading apparatus 50 to obtain the exposure conditions and the gradient employed in the photographing operation.

Initially, the host 60 sequentially stores, in an image memory of the host 60, prescanned image data for one negative film transmitted for each line from the reading apparatus 50 (Q2-1).

When the prescanning completion signal has been received, histogram (distribution of outputs (see FIG. 8)) of gradients classified into [0 to 255] is produced for all of pixels for one image of image data stored in the image memory (Q2-2).

Threshold Wmin for a dark portion and threshold Bmax for a bright portion of the gradient are obtained, and then a gamma function data lookup table in which input values and output values are made to correspond to one another is produced in accordance with a gamma function obtained by logarithmically converting the coordinates of Wmin and Bmax (Q2-3).

The value in the lookup table is, as gamma function data for main scanning (see FIG. 9) for the reading apparatus 50, transmitted together with the main scanning instruction signal (SQ-4).

Gradient function data for main scanning is obtained as a gamma function curve which is a gamma curve expressing the relationship of the transmittance of a color negative film and the output level in the reading apparatus 50 and which is exemplified as input/output characteristics of the reading apparatus 50 as shown in FIG. 9 to make ideal the gradient reproducing characteristic of image data which is output from the reading apparatus 50.

Figure 8:
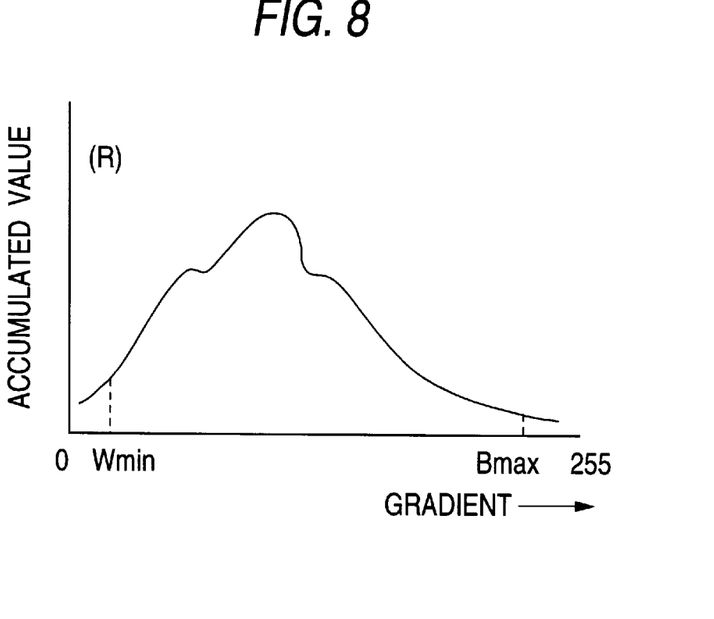
FIG. 8 is a graph showing an example of a threshold when histogram is produced.

The histogram can be obtained such that a detection of the gradient is performed among the gradients (the brightness) of each of all pixels for one image of image data stored in the image memory and attempted to be scanned is examined and classified into [0 to 255], and the frequency of appearance is accumulated (counted) for each gradient.

The threshold Wmin for a dark portion is a gradient realized when an accumulated value, obtained by accumulating accumulated value for each gradient in the produced histogram in a direction from a low gradient portion (white level=0) to a high gradient portion, with respect to the number of all pixels exceeds a predetermined ratio (WP). The threshold Bmax is a gradient when an accumulated value, obtained by accumulating accumulated value for each gradient in a direction from a high gradient portion (black level=255) to a low gradient portion, with respect to the number of all pixels exceeds a predetermined ratio (BP). Although representative preferred thresholds are such that WP=0.05 and BP=0.02, the values are not limited to the foregoing values. It is preferable that the appropriate values be set to be adaptable to the type of the transmissive original document.

The input/output characteristics of the negative film can be approximated by a straight line on a logarithmic coordinates. Therefore, gamma function F (T) can be obtained by obtaining coordinates of two points for performing linear interpolation on the logarithmic coordinates. Coordinates x and y of two points W (Wx, Wy) and B (Bx, By) can be obtained by the following equations:

Wx=K×log (Wmin/255)

Bx=K×log (Bmax/255)

Wy=WPout

By=BPout

K=3.322=1/log (2)

where WPout and BPout are constants and are typically WPout=−0.06 and BPout=−6.

The required gamma function F (T) can be obtained by $$F(T)=a \times T+b$$

where T=K×log (t/255), a=(Wy−By)/(Wx−Bx), and b=By−a×Bx.

The gamma function data is a value in a lookup table (a gamma function data table in which the gamma function is normalized to linear coordinates [0 to 255] and the film transmittance t [0 to 255] for reading a negative film and output value f [0 to 255] are made to correspond to one another by 8—8 bits.

Assuming that the transmittance of the negative film is t, gamma function data table f can be obtained as follows:

$$f=INT(255 \times 2^{F(T)})$$

$$T=k \times \log(t/255)$$

where function INT is a function for forming a result of the calculation into an integer form and outputting a value not smaller than 255 as 255.

The foregoing steps are performed for each of R, G and B.

A third step is performed such that when main scanned image data items have been received from the reading apparatus 50, image data items are sequentially stored in the image memory (Q3-1).

When a main scanning completion signal has been received from the reading apparatus 50, the host 60 detects whether or not a signal indicating that the film has completely been read is included in the received signal. If reading of the film has been completed, the control is shifted to execution of a predetermined process of an application program or the like. If reading of the film has not been completed, a prescanning instruction signal is transmitted to the reading apparatus 50 (Q3-2).

In the color image reading system according to this embodiment, gamma function data for prescanning is required to be initially transmitted once from the host 60. Since the reading apparatus 50 stores gamma correction data for prescanning and the magnification of the quantity of light, only the prescanning instruction signal is required to be transmitted in step Q3-2. When resetting is performed (interruption of the process attributable to the program or the reading apparatus 50), the control is returned to step Q1 to transmit, to the reading apparatus 50, gamma function data for prescanning and the prescanning instruction signal.

Although this embodiment has been described about the structure in which the image reading method according to the present invention is applied to an image reading system composed of the reading apparatus 50 and the host 60, a structure may be formed in which the image reading method according to the present invention is executed by the reading apparatus 50. In this case, the structure is required to be formed such that the image memory for storing prescanned image data is provided for the reading apparatus 50 and the means for performing the operations in the host 60 are stored in the ROM (or the storage unit) of the reading apparatus 50.

Although this embodiment has the structure arranged such that the gamma conversion data for main scanning is formed into the 8—8 bit lookup table, another structure may be employed in which the gamma conversion data table for main scanning provided for the host 60 is formed by 12 bits—12 bits to transmit the same to the reading apparatus 50 in order to make dense data in the sharp gamma curve portion because the reading apparatus 50 performs a 12 bits—12 bits process.

C. Contents of First Embodiment of Color Image Reading Apparatus

FIG. 4 is a diagram showing the schematic structure of a first embodiment of the color image reading apparatus according to the present invention. A reading apparatus 50' has an original-document retaining frame 1 made of a transparent plate made of glass or the like and placed on a box-like case 2. The case 2 includes a carriage 3 arranged to move in parallel to the original-document retaining frame 1 by a drive unit (not shown). A light source 4 and a line sensor 5 are mounted on the carriage 3. A light source 6 for reading a transmissive original document, such as a color negative film, is disposed above the original-document retaining frame 1. The light source 6 is, similarly to the light source 4, moved when the carriage 3 is moved. The light source 4 is used when an original document 8 is not the transmissive original document but the same is a reflecting original document having the surface which reflects light emitted from the light source. When a reflecting original document is set, scanning of a switch button or the like of an operation panel (not shown) enables switching of the light source 4 and the light source 6.

Illumination light emitted from the light source 6 is arranged to pass through the transmissive original document placed on the original-document retaining frame 1 and the original-document retaining frame 1 through a diffusion plate (not shown), and then converged to the line sensor 5 by a converging lens 7. The light source control and the sensor signal process which are performed when the original document 8 is a transmissive original document, such as a negative film, are the same as those shown in FIG. 1 and they are omitted from description.

If the original document 8 is a reflecting original document, control which is performed by the light-source control portion 10 is switched to the light source 4 simultaneously with the above-mentioned light source switching operation shown in FIG. 1. Moreover, image data obtained by prescanning and main scanning is output.

When process 1 (initializing) shown in FIG. 2 is performed in this embodiment, the light source 6 is turned on in a portion on the original-document retaining frame 1 in which the original document 8 is not placed until the output from the line sensor 5 is made to be predetermined value V0. Illumination light emitted from the light source 6 is allowed to pass through the original-document retaining frame 1 through the diffusion plate (not shown), and then converged on the line sensor 5 by the converging lens 7.

D. Contents of Second Embodiment of Color Image Reading Apparatus

Figure 5:
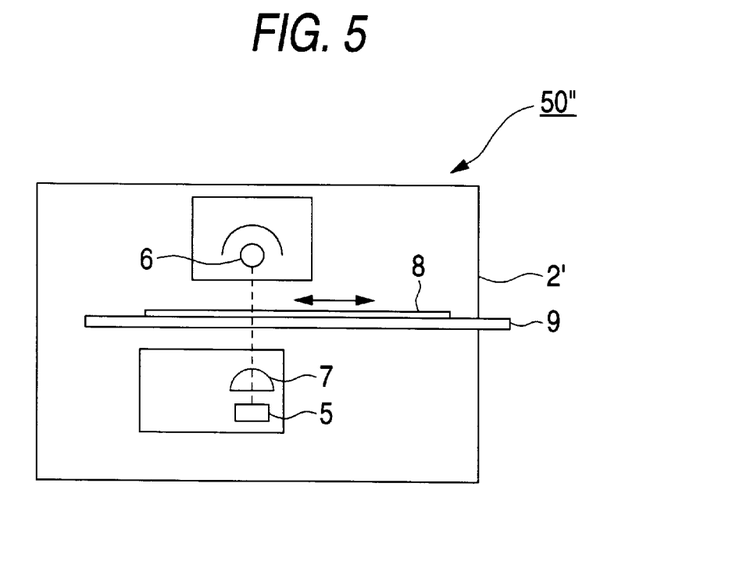
FIG. 5 is a diagram showing the schematic structure of another embodiment of the reading portion of the color image reading apparatus.

FIG. 5 is a diagram showing the schematic structure of a second embodiment of the color image reading apparatus. A reading apparatus 50'' has, in a box-like case 2', an original-document holder 9 for holding a transparent original document 8, such as a color negative film. The original-document holder 9 is moved in parallel to a light source 6 and a line sensor 5 by a drive unit (not shown) and arranged such that a transmissive original document can be attached from outside of the case 2'. A light source 6 is disposed above the original-document holder 9 and the line sensor 5 is disposed below the same.

Illumination light emitted from the light source 6 is allowed to pass through the transmissive original document 8 held by the original-document holder 9 through a diffusion plate (not shown), and then converged to the line sensor 5 by a converging lens 7.

When process 1 (initializing) shown in FIG. 2 is performed in this embodiment, the light source 6 is turned on in a portion on the original-document holder 9 in which the original document 8 is not placed until the output from the line sensor 5 is made to be predetermined value V0. Illumination light emitted from the light source 6 is converged to the line sensor 5 by the converging lens 7 through a diffusion plate (not shown).

E. Contents of Embodiment of Gamma Function Data for Prescanning

FIG. 6 is a diagram showing an embodiment of gradient function data for use in the prescanning operation. In a case where the reading apparatus 50 uses values of a gamma curve shown in FIG. 6 as gamma function data for prescanning, the magnification of the quantity of light for prescanning is, as described above (refer to the description of process P2 shown in FIG. 2), such that the magnification of the quantity of light Cr=Cg=Cb=1 and also the gamma correction table is made such that input=output. Therefore, also in a case where a positive film, such as a slide film, is read by the reading apparatus according to the present invention, an advantage can be realized in that the necessity to temporarily performing positive/negative conversion as has been required for the conventional technique.

However, the magnification of the quantity of light is 1 in both cases, the curve of the image signal for converting the light quantity signal S2' into the image signal S3 is made to be the same as the curve of S2'. Therefore, the prevention of the quantization error occurring attributable to the characteristic of the gamma curve bent sharply near level 0 cannot be realized.

FIG. 7 is a diagram showing another example of gamma function data for use in prescanning in the present invention and improvement in the curve shown in FIG. 6.

When the reading apparatus 50 uses a curve shown in FIG. 7 (a) or 7 (b) as gamma function data for prescanning, the magnification of the quantity of light is, as described above (refer to description of process P2 shown in FIG. 2), such that Cr=1, Cg=2 and Cb=3. Therefore, the curve for converting the light quantity signal S2' into the image signal S3 is weighted in the order as 3, 2 and 1 in the order of the sharpness near 0 (in the sequential order as B, G and R). The gamma functions bent sharply near level 0 are expanded in the direction of the axis of abscissa by the degrees of the weights. As a result, the quantization accuracy of the prescanned image can be improved and thus the calculation accuracy of gamma function data for main scanning can be improved.

Although the curve shown in FIG. 7 (a) is constant for each color and also the value of the output conversion table is proportional, the color when a photographing operation is performed is not simply proportional and in proportion to a curve. Therefore, when gamma function data for main scanning is produced by the host 60, the curve shown in FIG. 7 (a) is corrected and a curve near an actual curve is formed as shown in FIG. 7 (b). If the curve shown in FIG. 7 (b) is used, the quantization accuracy can be improved as compared with a case where the curve shown in FIG. 6 (a) is used. As a result, the accuracy of prescanned image data to output can furthermore be improved.

Although the invention has been described in its preferred form, the present embodiment is therefore illustrative and not restrictive and the spirit and the scope of the invention are defined by only the appended claims rather than by the description preceding them.

We claim:

1. A color image reading method arranged such that illuminating light which has emitted from a light source and which has penetrated a color image original document is color-separated and converted into electric signals to output image data corresponding to predetermined colors, said method comprising the steps of:

obtaining an integrated light quantity reference value with which an output value for each color obtained by photoelectrically converting illuminating light emitted from said light source by an image sensor in a state where said original document is not set is made to be a predetermined value;

obtaining a quantity of light for prescanning from a first magnification of the quantity of light determined on the basis of first gamma function data corresponding to each color and said integrated light quantity reference value to perform prescanning of said color image original document, converting an image signal obtained by prescanning with gamma correction data obtainable on the basis of first gamma function data and outputting prescanned image data; and obtaining a quantity of light for main scanning from a second magnification of the quantity of light determined on the basis of second gamma function data on the basis of prescanned image data and said integrated light quantity reference value to perform main scanning of said color image original document, converting an image signal obtained by main scanning with gamma correction data obtained by second gamma function data on the basis of prescanned image data and outputting image data.

2. An image reading apparatus arranged such that illuminating light which has emitted from a light source and which has penetrated a color image original document is color-separated and converted into electric signals to output image data corresponding to predetermined colors, said apparatus comprising:

integrated light quantity reference value determining means for obtaining an integrated light quantity reference value with which an output value for each color obtained by photoelectrically converting illuminating light emitted from said light source by an image sensor in a state where said original document is not set is made to be a predetermined value; prescanning light quantity magnification determining means for determining a magnification of the quantity of light for prescanning on the basis of gamma function data for prescanning corresponding to each color; main scanning light quantity magnification determining means for determining a magnification of the quantity of light for main scanning on the basis of gamma function data obtained from prescanned image data; light quantity determining means for obtaining the quantity of light for main scanning on the basis of the magnification of the quantity of light for main scanning and a light quantity adjustment value obtainable from said integrated light quantity reference value; and gamma correction table producing means for producing a gamma correction table, wherein after said integrated light quantity reference value has been obtained by said integrated light quantity reference value determining means, the quantity of light for prescanning is obtained from predetermined gamma function data, an output signal is converted with gamma correction data obtainable on the basis of predetermined gamma function data to output prescanned image data, the quantity of light for main scanning is obtained from gamma function data produced on the basis of prescanned image data to perform main scanning of said color image original document, and image data obtained by converting an output signal with gamma correction data obtainable on the basis of gamma function data on the basis of prescanned image data is output.

3. A color image reading system comprising a color image reading apparatus according to claim 2 and a main apparatus for connecting said color image reading apparatus, wherein said main apparatus has histogram producing means which receives gamma function data for prescanning produced to correspond to the types of color image original documents and mainly-scanned image data from said color image reading apparatus so as to produce gradient histogram of an image of interest, gamma function producing means which obtains a threshold for a dark portion and a threshold for a bright portion from said histogram so as to obtain a gamma function, gamma function table producing means for obtaining gamma function data from said gamma function, image data receiving means for receiving image data from said color image reading apparatus and gamma function transmitting means for transmitting gamma function data to said color image reading apparatus, and said main apparatus transmits gamma function data for prescanning to said color image reading apparatus, then receives mainly-scanned image data from said color image reading apparatus to obtain gamma function data for main scanning, transmits gamma function data for main scanning to said color image reading apparatus and receives image data after main scanning has been performed.

4. A recording medium storing said integrated light quantity reference determining means, said prescanning light quantity magnification determining means, said main scanning light quantity magnification determining means, said light quantity determining means and said gamma correction table producing means according to claim 2 in such a manner that a computer is able to read the same.

5. A recording medium storing said histogram producing means, said gamma function producing means, said gamma function table producing means, said image data receiving means and said gamma function transmitting means according to claim 3 in such a manner that a computer is able to read the same.

6. A recording medium storing computer-readable instructions for enabling an image reading apparatus that is arranged such that illuminating light that has emitted from a light source and has penetrated a color image original document is color-separated and converted into electric signals to output image data corresponding to predetermined colors, said computer-readable instructions comprising:

instructions for obtaining an integrated light quantity reference value with which an output value for each color obtained by photoelectrically converting illuminating light emitted from said light source by an image sensor in a state where said original document is not set is made to be a predetermined value;

instructions for determining a first magnification value for prescanning on the basis of gamma function data for prescanning corresponding to each color;

instructions for determining a first quantity of light for prescanning on the basis of the first magnification value and the integrated light quantity reference value;

instructions for determining a second magnification value for main scanning on the basis of gamma function data obtained from prescanned image data;

instructions for obtaining a second quantity of light for main scanning on the basis of the second magnification value and the integrated light quantity reference value; and instructions for producing a gamma correction table.

7. A recording medium storing computer-readable instructions for enabling an image reading system comprising a color image reading apparatus and a main apparatus to read a color image from an color image original document, said computer-readable instructions comprising:

instructions for receiving gamma function data for prescanning from said main apparatus, wherein said gamma function data corresponds to types of color image original documents;

instructions for receiving prescanned image data from said color image reading apparatus so as to produce a gradient histogram of an image of interest;

instructions for obtaining a threshold for a dark portion and a threshold for a bright portion from said histogram so as to obtain a gamma function;

instructions for obtaining gamma function data from said gamma function;

instructions for transmitting gamma function data to said color image reading apparatus; and instructions for receiving image data from said color image reading apparatus.

* * * * *